United States Patent
Joshi et al.

(10) Patent No.: US 8,494,283 B2
(45) Date of Patent: Jul. 23, 2013

(54) IMAGE QUALITY ASSESSMENT

(75) Inventors: Neel Joshi, Seattle, WA (US); Ashish Kapoor, Kirkland, WA (US); Huixuan Tang, Toronto (CA)

(73) Assignee: Microsoft Corporation, Redmond, WA (US)

( * ) Notice: Subject to any disclaimer, the term of this patent is extended or adjusted under 35 U.S.C. 154(b) by 350 days.

(21) Appl. No.: 12/975,026

(22) Filed: Dec. 21, 2010

(65) Prior Publication Data

US 2012/0155765 A1    Jun. 21, 2012

(51) Int. Cl.
*G06K 9/46*    (2006.01)
(52) U.S. Cl.
USPC .......................................... 382/190; 382/191
(58) Field of Classification Search
USPC .......................... 382/100, 190, 191
See application file for complete search history.

(56) References Cited

U.S. PATENT DOCUMENTS

| | | | |
|---|---|---|---|
| 6,067,118 A * | 5/2000 | Chen et al. ............ | 375/240.03 |
| 7,545,985 B2 | 6/2009 | Zhang et al. | |
| 7,590,287 B2 * | 9/2009 | Lu et al. ............... | 382/190 |
| 7,733,372 B2 * | 6/2010 | Ong et al. .............. | 348/180 |
| 8,086,007 B2 * | 12/2011 | Yan et al. .............. | 382/128 |
| 8,126,197 B2 * | 2/2012 | Jones et al. ............ | 382/100 |
| 2004/0114685 A1 * | 6/2004 | Kouloheris et al. ... | 375/240.03 |
| 2007/0047838 A1 | 3/2007 | Milanfar et al. | |
| 2008/0285860 A1 | 11/2008 | Datta et al. | |
| 2010/0037059 A1 | 2/2010 | Sun et al. | |

OTHER PUBLICATIONS

Hamid Rahim Sheikh, et al. "No-reference quality assessment using natural scene statistics: JPEG2000", IEEE Transaction on Image Processing, vol. 14, Nov. 2005.*

Pina Marzilianol , Frederic Dufaux2, Stefan Winkler, Touradj Ebrahimi, "Perceptual blur and ringing metrics: application to JPEG2000", Signal Processing: Image Communication vol. 19, Issue 2, Feb. 2004, pp. 163-172.*

Saad, Michele A.; Bovik, Alan C.; Charrier, Christophe "A DCT statistics-based blind image quality index", IEEE Signal Processing Letter, Jun. 2010, p. 583-586.*

Larson, et al., "Most apparent distortion: full-reference image quality assessment and the role of strategy", Retrieved at << http://vision.okstate.edu/pubs/MAD_JEI.pdf >>, Journal of Electronic Imaging 19(1), 011006 (Jan.-Mar. 2010 pp. 21.

Tong, et al., "Learning No-Reference Quality Metric by Examples", Retrieved at http://citeseerx.ist.psu.edu/viewdoc/download?doi=10.1.1.114.349&rep=rep1&type=pdf >>, 2005, pp. 8.

Zhu, et al., "Automatic Parameter Selection for Denoising Algorithms Using a No-Reference Measure of Image Content", Retrieved at << http://citeseerx.ist.psu.edu/viewdoc/download?doi=10.1.1.165.8962&rep=rep1&type=pdf >>, 2009, pp. 33.

(Continued)

*Primary Examiner* — Li Liu

(57) ABSTRACT

Methods and systems for image quality assessment are disclosed. A method includes accessing an image, identifying features of the image, assessing the features and generating subjective scores for the features based upon a mapping of the features to the subjective scores and based on the subjective scores, generating an image quality score. Access is provided to the image quality score.

17 Claims, 7 Drawing Sheets

OTHER PUBLICATIONS

Laparra, et al., "Image Denoising with Kernels Based on Natural Image Relations", Retrieved at << http://jmlr.csail.mit.edu/papers/volume11/laparra10a/laparra10a.pdf >>, Journal of Machine Learning Research 11 (2010), Feb. 2010, pp. 873-903.

Tang Huixuan, "Performance of global image quality metrics with reference", Jul. 26, 2010, pp. 5.

"Learning Blind Image Quality Assessment", CVPR 2010, pp. 5.

Tang, Huixua, "A Note on Image Quality Assessment", Jun. 28, 2010, pp. 6.

Tang, Huixua, "What are Good Perceptual Image Quality Features", Jul. 29, 2010, pp. 3.

* cited by examiner

IMAGE QUALITY ASSESSMENT

BACKGROUND

Image quality assessment involves the assessment of the quality of images that are intended for human consumption. Image quality is a characteristic of an image that relates to perceived image degradation as compared to an ideal or perfect image reference (e.g., a target or un-degraded image reference). Images such as those that are provided by photographs can go through many stages of processing that affect image quality before they are presented to a human observer.

For example, each stage of image processing can introduce distortion that can reduce the quality of the final image that is produced. Images acquired by cameras can exhibit distortions due to optics, sensor noise, color calibration, exposure control, camera motion, etc. Other sources of distortion can include compression algorithms and bit errors.

Conventional image quality assessment systems attempt to assess the quality of images and to gauge the distortion that is added to an image during various stages of processing. Moreover, these systems attempt to automatically assess perceived image quality using quantitative measures. Image quality assessment metrics can play an important role in applications, such as image acquisition, compression, communication, displaying, printing, restoration, enhancement, analysis and watermarking.

In the signal and image processing fields the most common measures for judging image quality are PSNR (Peak-Signal-To-Noise) quality measures. However, it is well known that PSNR quality measures do not correlate well with perceptual quality. Furthermore, such measures can require a reference image for comparison, making them useful only in limited situations, such as synthetic experiments. Unfortunately, there are numerous cases where a reference image may be unavailable, such as situations that involve the judging of the quality of a de-noising algorithm on a real-world dataset, where the underlying noise-free image is unknowable. In this case, one would need to employ a "no-reference" or "blind" measure to render a quality assessment. Indeed, in most practical cases, a reference image is not available, and consequently in such cases image quality assessment is made more difficult.

Accordingly, a challenge that confronts conventional image quality assessment systems is to provide assessments when neither the reference image nor the image distortion type is known. One conventional approach uses distortion specific image quality measures as well as a distortion type classifier as tools for image quality assessment. However, conventional approaches, including this one, exhibit bias across distortion types. In addition, conventional approaches have proved to be limited in their capacity to provide image quality assessments that reflect perceptual quality. Accordingly, these approaches are not always useful for assessing quality as perceived by human observers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Many conventional image quality assessment systems are limited in their capacity to provide image quality assessments that reflect perceptual quality. As such, these systems are not always useful for assessing quality as perceived by human observers. A methodology for image quality assessment is disclosed herein that addresses such shortcomings by using subjective scoring that is able to predict a human observer's rating of image quality. However, the claimed embodiments are not limited to implementations that solve any or all of the aforementioned shortcomings. As a part of the disclosed methodology, an image is accessed, features of the image are identified, the features are assessed, subjective scores are generated for the features based upon a mapping of the features to the subjective scores (e.g., during algorithm training) and an image quality score is generated based on the subjective scores. Access is provided to the image quality score. In the aforementioned methodology, the subjective quality scores that are mapped to image features enable the provision of image quality predictions that reflect a subjective perceptual quality. In this manner, image quality predictions that assess quality as it is perceived by human observers can be made.

BRIEF DESCRIPTION OF THE DRAWINGS

The present embodiments are illustrated by way of example, and not by way of limitation, in the figures of the accompanying drawings and in which like reference numerals refer to similar elements.

The drawings referred to in this description are for illustration only and should not be understood as being drawn to scale except if specifically noted.

DETAILED DESCRIPTION

Reference will now be made in detail to embodiments of the claimed subject matter, examples of which are illustrated in the accompanying drawings. While the embodiments will be described, it will be understood that the description is not intended to limit the claimed subject matter to these embodiments. On the contrary, the claimed subject matter is intended to cover alternatives, modifications and equivalents, which may be included within the spirit and scope as defined by the appended claims. Furthermore, in the following detailed description, numerous specific details are set forth in order to provide a thorough understanding of the embodiments. However, it will be recognized by one of ordinary skill in the art that the embodiments may be practiced without these specific details. In other instances, well-known methods, procedures, components, and circuits have not been described in detail as not to unnecessarily obscure aspects of the embodiments.

Some portions of the detailed descriptions are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

It should be borne in mind, however, that these and similar terms are to be associated with the appropriate physical quantities and are merely convenient labels applied to these quantities. Unless specifically stated otherwise as apparent from the following discussions, it is appreciated that terms such as "accessing" or "assessing" or "generating" or "providing" or the like, refer to the action and processes of a computer system (e.g., computer system 101 of FIGS. 1 and 5), or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
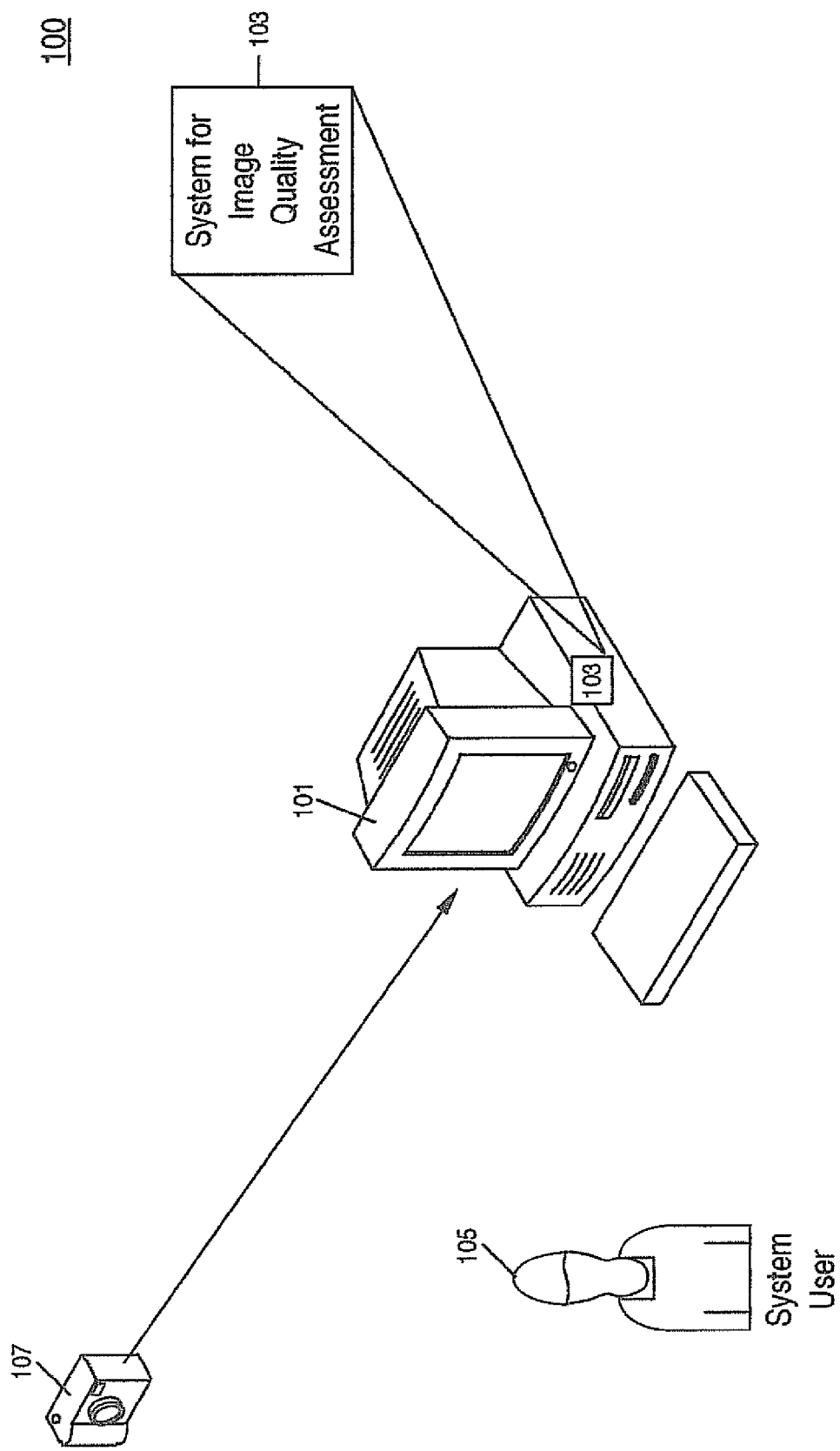
FIG. 1 shows an exemplary operational setting of a system for image quality assessment according to one embodiment.

Exemplary Operational Setting for System for Image Quality Assessment According to Embodiments FIG. 1 shows an exemplary operational setting 100 of a system 103 for image quality assessment according to one embodiment. System 103 uses subjective quality scores that are mapped to image features to provide image quality predictions that reflect a subjective perceptual quality. As such, system 103 provides image quality predictions that assess quality as it is perceived by human observers. In the FIG. 1 embodiment, exemplary operational setting 100 includes computer system 101, system 103 for image quality assessment, system user 105 and image source 107.

Referring to FIG. 1, system 103 executes on computer system 101. In one embodiment, system 103 performs image quality assessments on images that it accesses for that purpose, such as photographs or other images uploaded or downloaded onto computer system 101. In one embodiment, system 103 uses an image metric model (see FIGS. 2B and 2C and accompanying description herein) that correlates image features with subjective scores. In one embodiment, the scores for the image features are combined to provide an overall image quality score for an accessed image. The image metric model is trained to provide scoring with regard to the image features that predicts a human observers rating of image quality.

Image Quality Features

In one embodiment, the image features include a plurality of features that are relevant respectively to different dimensions of image quality. In one embodiment, the image features can include but are not limited to natural image statistics, texture features, direct blur and noise measure. Neighborhood embedding of the aforementioned features cluster images of similar quality and overlapping distortion type, enabling system 103 to be used to assess new images and distortion types.

It should be appreciated that an image that is likely to be a "natural" image is likely to be of high quality. In one embodiment, models can be used to evaluate the likelihood that an image is a natural image. In one embodiment, objective functions such as high-frequency responses of images can be used effectively for image enhancement applications and are an effective measure of image quality. Although they appear in different forms from image gradients, DCT coefficients to field of expert responses, the statistics of these responses, behave similarly. In one embodiment, complex pyramid wavelet transform (due to its reconstruction properties), pyramid representation, and translational invariance property can be used. In such embodiments, natural images are most commonly described as images whose real or imaginary coefficients follow a zero-peak, heavy-tailed distribution. In one embodiment, noise has a smoothing effect on the distribution of the wavelet coefficients, and blur compresses the distribution towards zero by reducing contrast of the image. In one embodiment, the extent of blur in compressed images may not be as significant as with Gaussian blurred images of the same quality, because artifacts may not be conveyed in the distribution of real coefficients.

In one embodiment, the coefficients can be represented by magnitude and phase to increase effectiveness. Similar to real coefficient distributions, blur compresses the magnitude distribution and noise changes its shape. The phase distribution of the coefficients shows a distinct capability to discriminate compression artifacts by exhibiting an oscillating pattern, resulting from quantization error produced by compression. The aforementioned distribution can be described by analytical models. In one embodiment, the real and imaginary coefficients distribution can be modeled by a generalized Gaussian as follows:

$$p(x;\gamma,\lambda)=\gamma\lambda^{1/\gamma}/2\Gamma(1/\gamma)\exp(-\lambda|x|^\gamma)$$

and the magnitude distribution can be modeled with a Weibull distribution as follows:

$$p(x;\gamma,\lambda)=\begin{cases}\lambda\gamma x^{\gamma-1}\exp(-\lambda|x|^\gamma) & x\geq 0\\ 0 & x\leq 0\end{cases}$$

In one embodiment, these models can be used to evaluate the maximal likelihood that an image is a natural image with a MAP (Maximum A-Posteriori) estimate. In one embodiment, the generalized Gaussian and Weibull parameters are estimated with MLE (Maximal Likelihood Estimation). In one embodiment, both the estimated model parameters and the likelihood achieved with these parameters are used as features, in order to convey both prior distribution of parameters and the likelihood of the image under the most likely parameters.

In one embodiment, the cross-scale distribution of wavelet coefficient magnitude is also a meaningful feature, as high quality images often show self-similarity across scales. Accordingly, the coarse scale and fine scale coefficients are statistically correlated. The behavior of a distortion on this joint distribution is similar to that which occurs with respect to the marginal distributions, a difference being that the extent of degradation can be larger in the finer scale than in the coarser scale.

It is appreciated that when distortion is severe, the likelihood that an image is a natural image can be no low that it can be difficult to discriminate the difference in quality using a natural image model. However, in such cases a distortion-specific texture can be used. For instance, JPEG images can present an 8×8 block texture, and JPEG2000 images of high compression rates often suffer from ringing around corners and edges. Therefore, the prominence of these textures is a measure that complements that of natural image prior based features. In one embodiment, the cross-scale distribution of coefficient phase is used to provide an indicator of distortion-induced local image texture. Exemplary marginal distribution and cross-scale joint distribution features that may be used in the herein described processes (e.g., training, feature extraction) are listed in Table 1 below.

TABLE 1

Exemplary Features

Marginal Distribution Feature negative log histogram of magnitude
negative log histogram of real
negative log histogram of phase
MLE estimates of GGD parameter/likelihood of real
MLE estimates of WBD parameter/likelihood of magnitude
Cross Scale Joint Distribution Feature negative log histogram of phase
negative log histogram of magnitude Referring again to FIG. 1, computer system 101 can be a desktop, laptop or any other type computer system that can accommodate the operation of system 103. In one embodiment, system user 105 can access system 103 via computer system 101 and input images into system 103 for quality assessment purposes.

Image source 107 can include but is not limited to cameras, memory sticks, cell phones, other computer systems, etc. In one embodiment, a system user 105 can transfer images to computer system via image source 107. Moreover, in one embodiment, the images can be placed in a list or directory of images that are stored on computer system 101.

Exemplary embodiments enable image quality scoring where neither the ground truth image (e.g., reference image) nor the degradation/distortion type or source is known. This is advantageous as in realistic settings a reliance on a reference image for image assessments may be impractical. However, exemplary embodiments, support image quality scoring where the ground truth image and degradation/distortion type are known as well. As used herein, the term "ground truth image" or reference image is intended to refer to a target or un-degraded image.

Operation

Figure 2A:
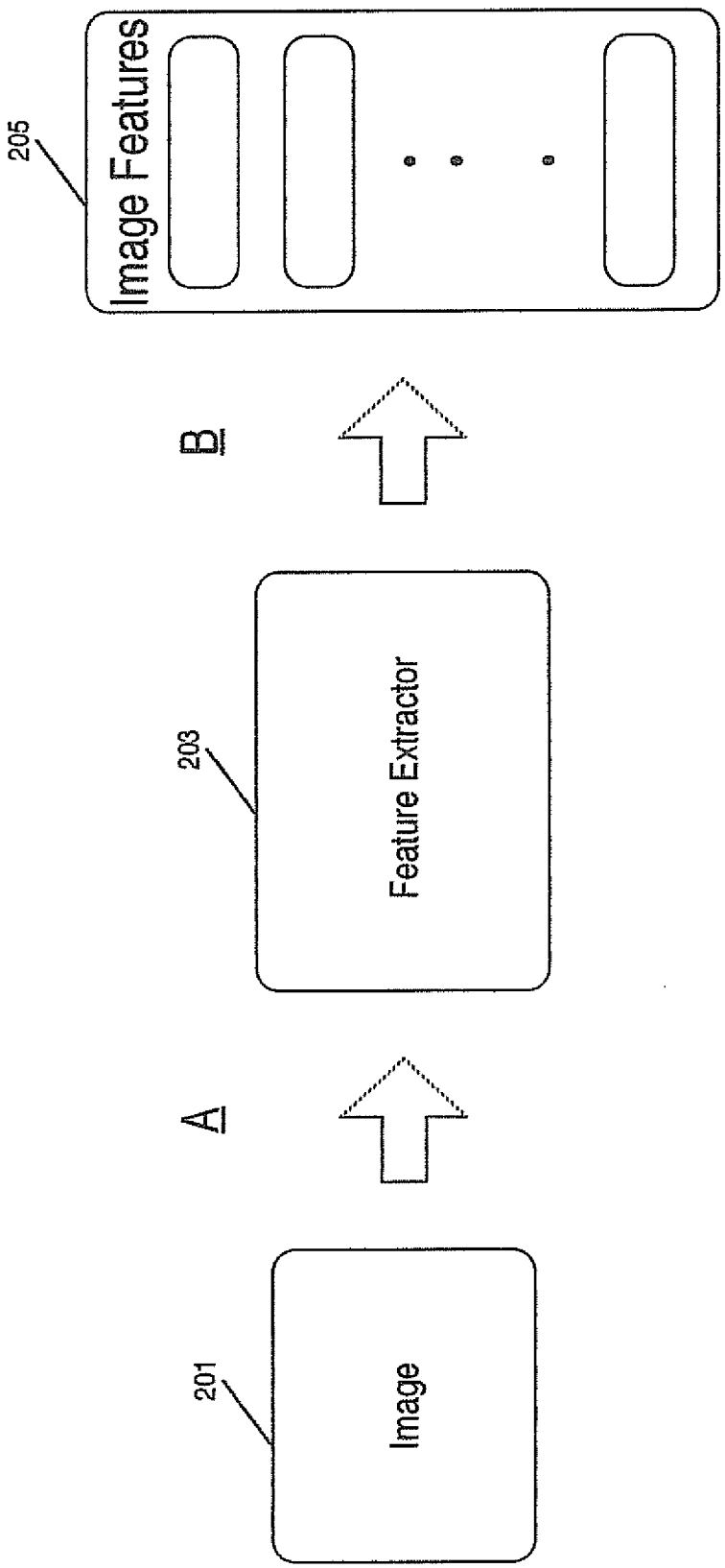
FIG. 2A illustrates operations of components that support a system for image quality assessment according to one embodiment.
Figure 2B:
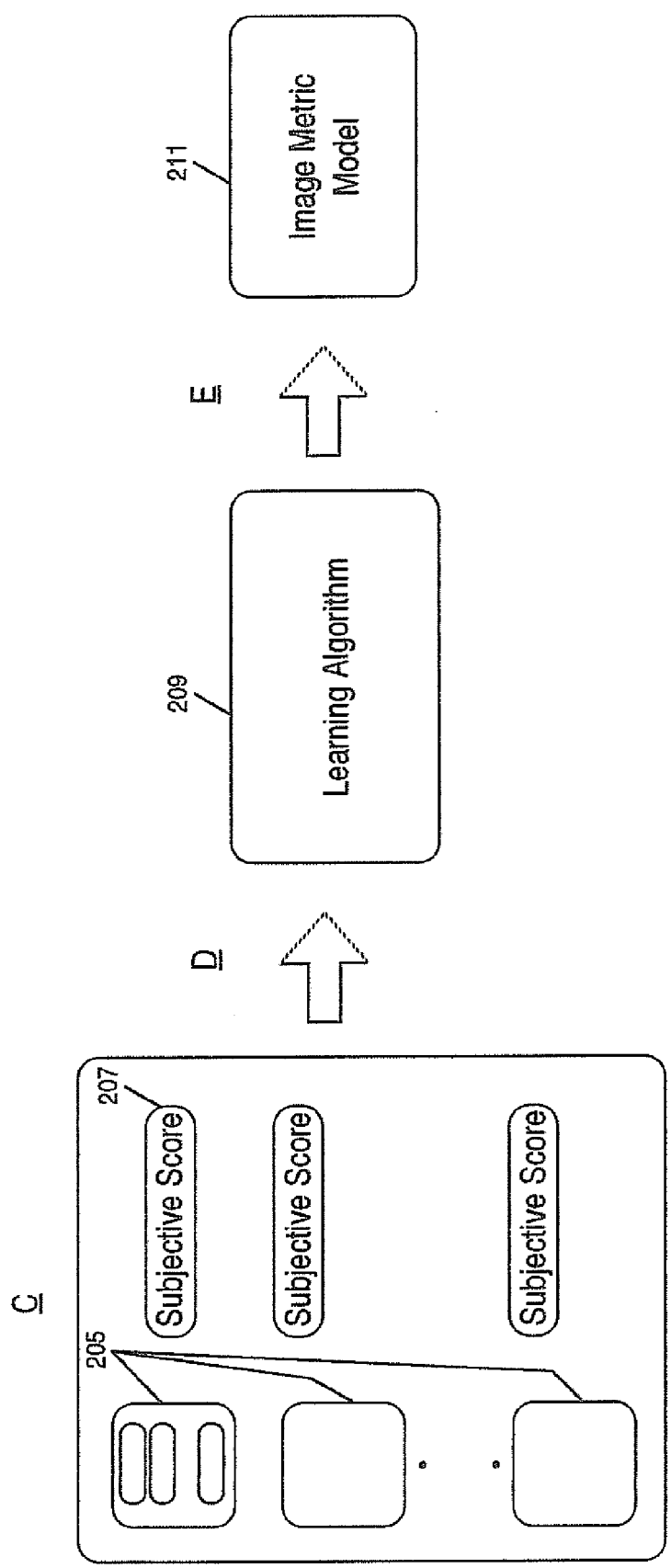
FIG. 2B illustrates operations of components that support a system for image quality assessment according to one embodiment.
Figure 2C:
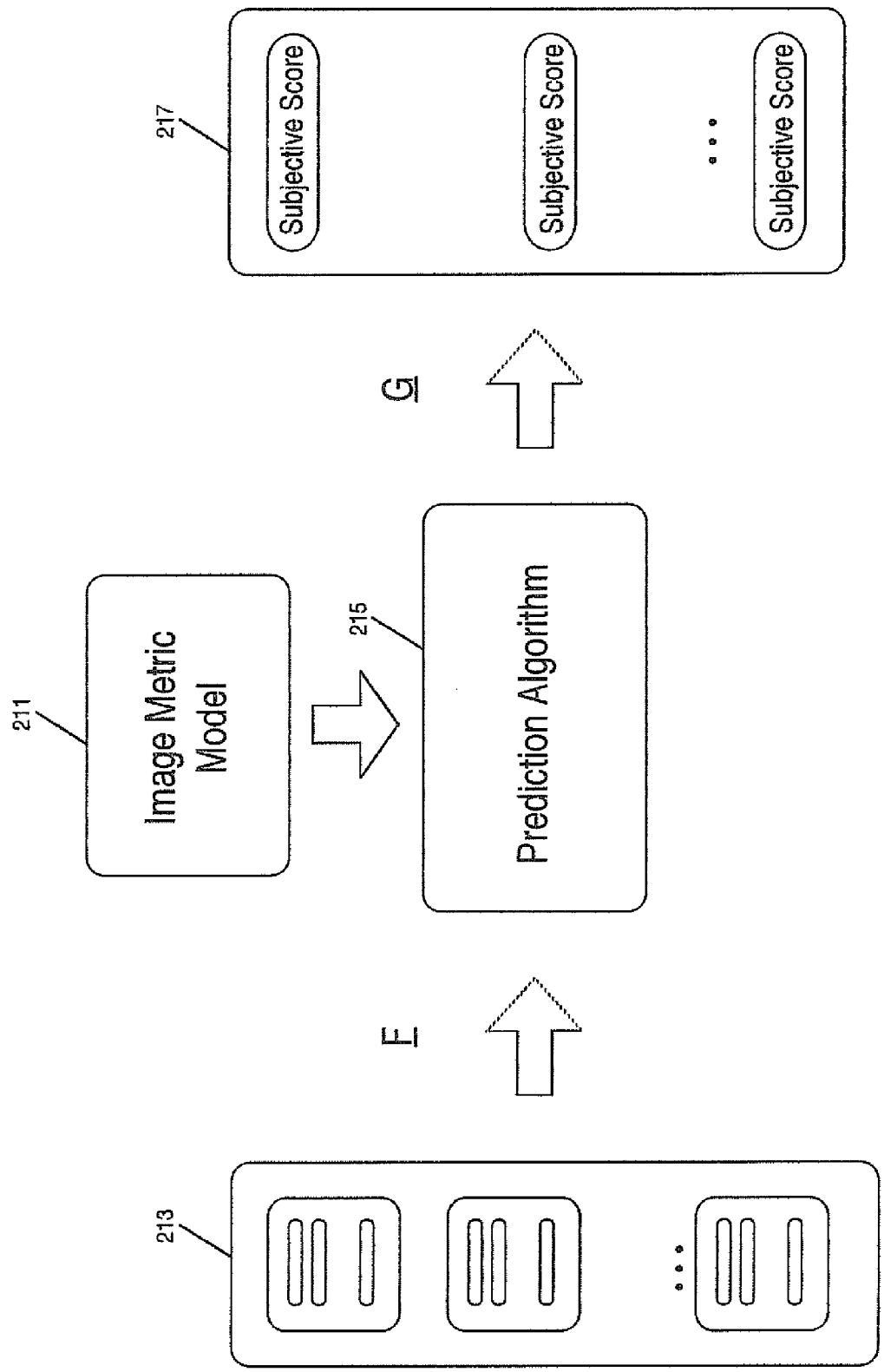
FIG. 2C illustrates operations performed by a system for image quality assessment according to one embodiment.

FIGS. 2A-2C illustrate the operation of system 103 for image quality assessment according to one embodiment. These operations, which relate to the image quality assessment, are illustrated for purposes of clarity and brevity. However, it should be appreciated that other operations which relate to image quality assessment not shown in FIGS. 2A-2C can be performed as well in accordance with one embodiment.

Referring to FIG. 2A, at A an input image 201 is input into feature extractor 203 for feature extraction. In one embodiment, input image 201 can include but is not limited to photographs and video images.

At B, feature extractor 203 extracts predefined image features 205 from input image 201. In one embodiment, given an input image 201, feature extractor 203 identifies a number of image features 205 that correspond to different aspects of low level image quality (see Table 1).

Referring to FIG. 2B, at C, the image features 205 extracted at B, are given subjective scores 207. In one embodiment subjective scores 207 can be based on human image quality assessments and are therefore subjective in character. In other embodiments, the subjective scores can be based on other sources of subjective image quality assessments.

At D, image features 205 and corresponding subjective scores 207 are input into learning algorithm 209. Based on this information, a training of learning algorithm 209 is effected where learning algorithm 209 learns the mapping of the extracted features to the subjective scores. Moreover, the aforementioned mapped data forms a part of the training data set (that can contain human image quality assessments correlated to image features amongst other data) upon which the training of learning algorithm 209 is based. In one embodiment the training process continues until scoring with regard to the training data set is maximized. In one embodiment, the training enables learning algorithm 209 to predict subjective user image quality ratings. In one embodiment, the product of the training is a model (e.g., image metric model 211) that can be used to automatically provide subjective scoring for images (see discussion below). In an alternate embodiment, scores from a separate scoring algorithm can be combined with the scores from learning algorithm 209. For example, scores from a separate scoring algorithm can be used as an additional input that provides additional mapping data such that new mapping can be learned.

At E, an image metric model 211 is produced. Image metric model 211 is formed from the training of learning algorithm 209. In one embodiment, image metric model 211 is used to predict user image quality ratings based on the mappings learned by learning algorithm 209 as a part of the training process. In one embodiment, image metric model 211 has a subjective scoring character that enables it to predict subject user image quality ratings.

Referring to FIG. 2C, at F, a new image or images 213 is received as an input to prediction algorithm 215. In addition, prediction algorithm 215 receives inputs of information from image metric model 211. In one embodiment, prediction algorithm uses this data to generate or "predict" subjective scores for the images 213 that it receives.

At G, prediction algorithm 215 generates subjective scores 217 for received images 213. In one embodiment, subjective scores 217 are the final output of the prediction algorithm 215 and represents a measure of image quality across a number of distortion and degradation types. In one embodiment, the image quality scores can be used for automatic tagging, sorting, deleting and selecting of images.

Components of System for Image Quality Assessment According to One Embodiment

Figure 3:
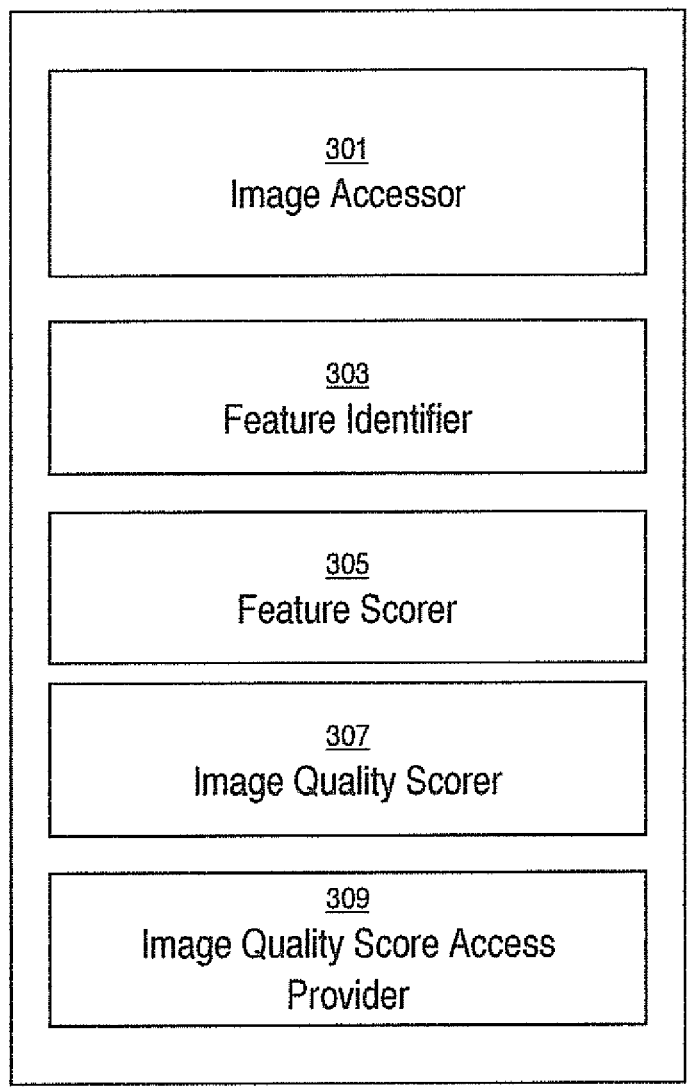
FIG. 3 shows components of a system for image quality assessment according to one embodiment.

FIG. 3 shows components of a system for image quality assessment 103 according to one embodiment. In one embodiment, components of system 103 implement an algorithm for image quality assessment. In the FIG. 3 embodiment, components of system 103 include image accessor 301, feature identifier 303, feature scorer 305, image quality scorer 307 and quality score access provider 309.

Referring to FIG. 3, image accessor 301 accesses an image or images for image quality assessment. In one embodiment, the image or images can be a new set of images (images not a part of training data set). In one embodiment, image accessor 301 can be implemented by image receiving components of a prediction algorithm (e.g., 215 in FIG. 2C).

Feature identifier 303 identifies features of an accessed image. In one embodiment, the features identified from the accessed image can include but are not limited to natural image statistics, texture features and direct blur/noise (see Table 1 discussed above for exemplary features). In other embodiments, other features can be identified. In one embodiment, feature identifier 303 can be implemented by feature identifying components of an image metric model (e.g., 211 in FIG. 2C).

Feature scorer 305 provides a score for identified features of the accessed image. In one embodiment, feature scorer 305 generates subjective scores for the identified features of the accessed image. In one embodiment, the scoring can be based upon the mapping of the identified features of the accessed image to subjective scores during an algorithm training process. In one embodiment, feature scorer 305 can be implemented by feature scoring components of an image metric model (e.g., 211 in FIG. 2B).

Image quality scorer 307 assesses the quality of the accessed image and generates an image quality score. In one embodiment, image quality scorer 307 makes the image quality assessment based on the subjective scores that are mapped to respective image features. Image quality scorer 307 combines the information provided by the scores that are mapped to respective image features and generates a score that corresponds to image quality.

Image quality score access provider 309 provides access to the image quality score that is generated by image quality scorer 307. In one embodiment, the image quality score can be used for automatic tagging, sorting, deleting and selecting of images. In one embodiment, image quality score access provider 309 can be implemented by image quality score access providing components of a prediction algorithm (e.g., 215 in FIG. 2C). In one embodiment, examples of the types of systems that can be provided access to the image quality score include but are not limited to systems that evaluate image processing algorithms and/or to systems that sort and annotate collections of images according to image quality.

It should be appreciated that the aforementioned components of system 103 can be implemented in hardware or software or in a combination of both. In one embodiment, components and operations of system 103 can be encompassed by components and operations of one or more computer programs (e.g., an image management system). In another embodiment, components and operations of system 103 can be separate from the aforementioned one or more computer programs but can operate cooperatively with components and operations thereof.

Figure 4:
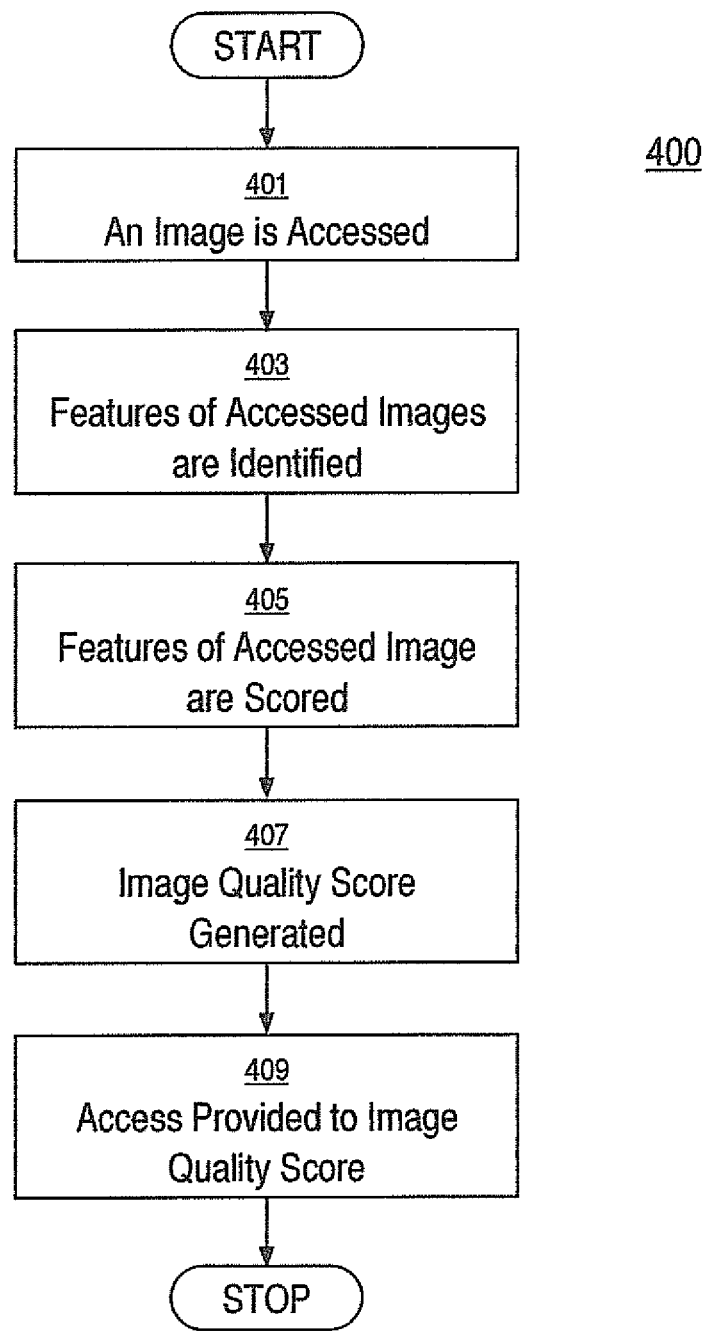
FIG. 4 shows a flowchart of a method for image quality assessment according to one embodiment.

Flowchart of Method for Image Quality Assessment According to One Embodiment FIG. 4 shows a flowchart 400 of the steps performed in a method for image quality assessment according to one embodiment. The flowchart includes processes that, in one embodiment can be carried out by processors and electrical components under the control of computer-readable and computer-executable instructions. Although specific steps are disclosed in the flowcharts, such steps are exemplary. That is the present embodiments are well suited to performing various other steps or variations of the steps recited in the flowchart. Within various embodiments, it should be appreciated that the steps of the flowchart can be performed by software, by hardware or by a combination of both.

Referring to FIG. 4, at 401, an image is accessed. In one embodiment, the image or images can be a new set of images (images apart from those that are in a training data set). In one embodiment the image can be imported from an external source (e.g., memory stick, camera, DVD, etc.)

At 403, features of the accessed image are identified (e.g., "extracted"). In one embodiment, the features can include butane not limited to natural image statistics, texture features and direct blur/noise. In other embodiments, other features can be identified. See Table 1 for a list of exemplary features.

At 405, the features of the accessed image are assigned a subjective score. In one embodiment, the features are mapped to subjective scores using information provided by an image metric model.

At 407, an image quality score is assigned to the accessed image. In one embodiment, the score is based on the subjective scores that are assigned to the respective identified features.

At 409, access is provided to the image quality score that is assigned to the accessed image. In one embodiment, the image quality score can be used for automatic tagging, sorting, deleting and selecting of images. In one embodiment, examples of the types of systems that can be provided access to the image quality score include but are not limited to systems that evaluate image processing algorithms and/or to systems that sort and annotate collections of photos according to image quality.

Exemplary Hardware According to One Embodiment

Figure 5:
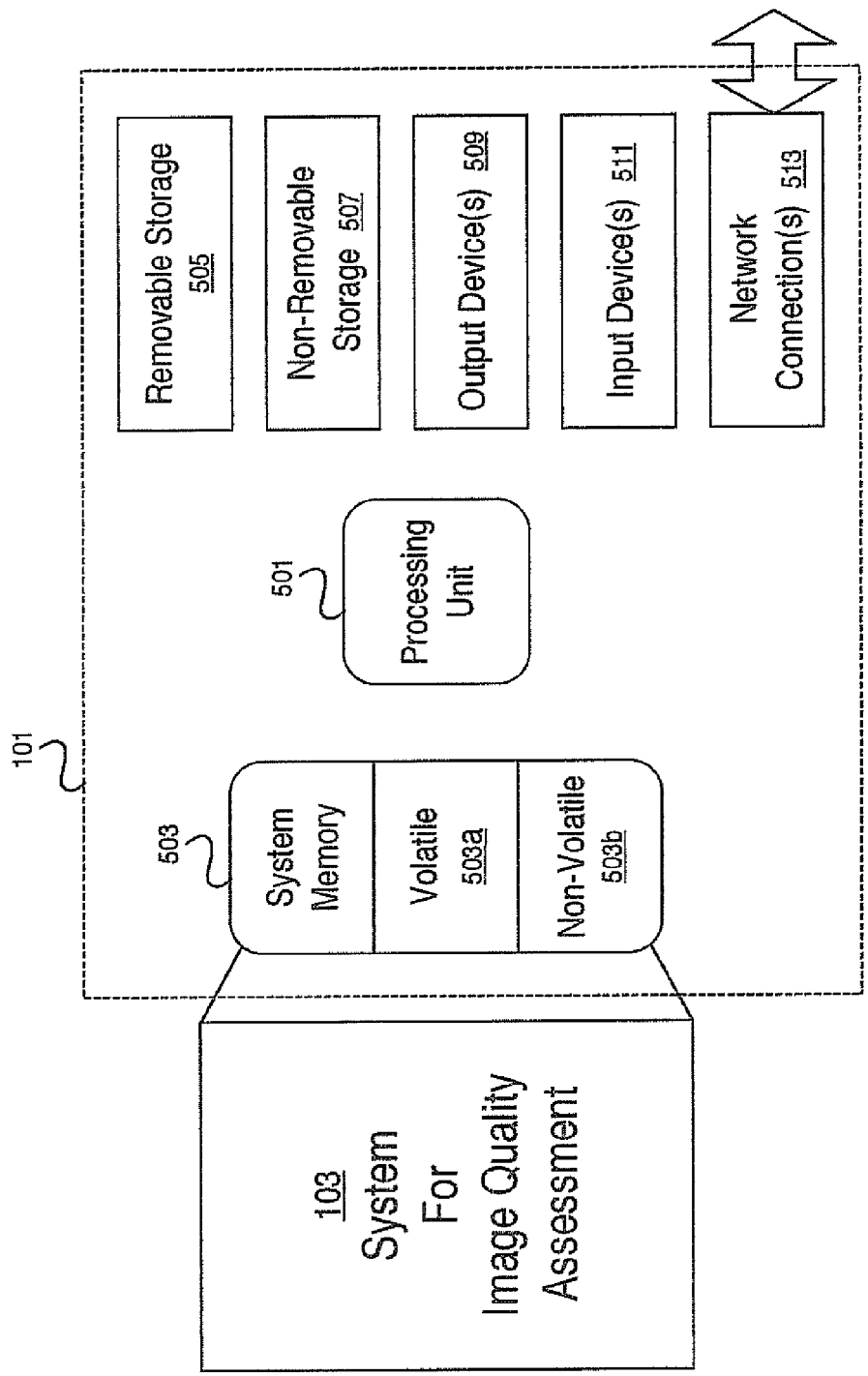
FIG. 5 shows an exemplary computer system according to one embodiment.

FIG. 5 shows an exemplary computer system 101 according to one embodiment. Computer system 101 includes components of a basic computer system and provides the execution environment for certain hardware-based and software-based functionality for the above described embodiments. Computer system 101 can be implemented as, for example, a desktop computer system, laptop computer system or server computer system. Similarly, computer system 101 can be implemented as a handheld device. Computer system 101 typically includes at least some form of computer readable media. Computer readable media can be a number of different types of available media that can be accessed by computer system 101 and can include, but is not limited to, computer storage media.

In its most basic configuration, computer system 101 typically includes processing unit 501 and memory 503. Depending on the exact configuration and type of computer system 101 that is used, memory 503 can be volatile (e.g., such as DRAM, etc.) 503*a*, non-volatile 503*b* (e.g., such as ROM, flash memory, etc.) or some combination of the two. In one embodiment, system 103 for image quality assessment can reside in memory 503 (see FIG. 5).

Additionally, computer system 101 can include mass storage systems (e.g., removable 505 and/or non-removable 507) such as magnetic or optical disks or tape. Similarly, computer system 101 can include input devices 511 and/or output devices 509 (e.g., such as a display). Computer system 101 can further include network connections 513 to other devices, computers, networks, servers, etc. using either wired or wireless media. As all of these devices are well known in the art, they need not be discussed in detail.

With reference to exemplary embodiments thereof methods and systems for image quality assessment are disclosed. A method includes accessing an image, identifying features of the image, assessing the features and generating subjective scores for the features based upon a mapping of the features to the subjective scores and based on the subjective scores, generating an image quality score. Access is provided to the image quality score.

The foregoing descriptions of the embodiments have been presented for purposes of illustration and description. They are not intended to be exhaustive or to limit the claimed subject matter to the precise forms disclosed, and many modifications and variations are possible in light of the above teaching. The embodiments were chosen and described in order to best explain the principles and practical applications of the embodiments, to thereby enable others skilled in the art to best utilize the various embodiments with various modifications as are suited to the particular use contemplated. It is intended that the scope of the claimed subject matter be defined by the claims appended hereto and their equivalents.

Although the subject matter has been described in language specific to structural features and/or methodological acts, it is to be understood that the subject matter defined in the appended claims is not necessarily limited to the specific features and acts described above. Rather, the specific features and acts described above are disclosed as example forms of implementing the Claims.

What is claimed is:

1. A method for image quality assessment, comprising:
   accessing (401) an image;
   identifying (403) features of said image wherein said features are marginal distribution features selected from the group consisting of negative log histogram of magnitude, negative log histogram of real, negative log histogram of phase, MLE (maximal likelihood estimation) estimates of GGD (generalized Gaussian distribution) parameter/likelihood of real and MLE estimates of WBD (Weibull distribution) parameter/likelihood of magnitude;
   assessing (405) said features and generating subjective scores for respective said features based upon a mapping of said features to said subjective scores;
   based on said subjective scores, generating (407) an image quality score; and
   providing access (409) to said image quality score.

2. The method of claim 1 wherein said features are selected from the group consisting of natural image statistics, texture features, direct noise blur and noise measure.

3. The method of claim 1 wherein said features are cross scale joint distribution features selected from the group consisting of negative log histogram of phase and negative log histogram of magnitude.

4. The method of claim 1 wherein said assessing is performed independent of a reference image and knowledge of a cause of degradation.

5. The method of claim 1 wherein said features are mapped to subjective quality scores based on one of a single and a plurality of learning algorithms.

6. The method of claim 1 wherein said image quality assessment is used for automatic tagging, sorting, deleting and selecting.

7. A method for image management using image quality assessment, comprising:
   importing (401) at least one image from an external source;
   identifying (403) features of said at least one image wherein said features are marginal distribution features selected from the group consisting of negative log histogram of magnitude, negative log histogram of real, negative log histogram of phase, MLE (maximal likelihood estimation) estimates of GGD (generalized Gaussian distribution) parameter/likelihood of real and MLE estimates of WBD (Weibull distribution) parameter/likelihood of magnitude;
   assessing (405) said features and generating subjective scores for respective said features based upon a mapping of said features to said subjective scores;
   based on said subjective scores, generating (407) an image quality score;
   providing access (409) to said image quality score; and
   providing access to said at least one image for exporting to an external source.

8. The method of claim 7 wherein said features are selected from the group consisting of natural image statistics, texture features, direct noise blur and noise measure.

9. The method of claim 7 wherein said features are cross scale joint distribution features selected from the group consisting of negative log histogram of phase and negative log histogram of magnitude.

10. The method of claim 7 wherein said assessing is performed independent of a reference image and knowledge of a cause of degradation.

11. The method of claim 7 wherein said features are mapped to subjective quality scores based on one of a single and a plurality of learning algorithms.

12. The method of claim 7 wherein said image quality assessment is used for automatic tagging, sorting, deleting and selecting.

13. A computer-readable storage device storing computer-executable components, comprising:
    an accessing component (301) for accessing an image;
    a feature identifying component (303) for identifying features of said image wherein said features are marginal distribution features selected from the group consisting of negative log histogram of magnitude, negative log histogram of real, negative log histogram of phase, MLE (maximal likelihood estimation) estimates of GGD (generalized Gaussian distribution) parameter/likelihood of real and MLE estimates of WBD (Weibull distribution) parameter/likelihood of magnitude;
    a feature scoring component (305) for scoring said features and generating subjective scores for respective said features based upon a mapping of said features to said subjective scores;
    an image quality scoring component (307) for generating an image quality score based on said subjective scores; and
    an access providing component (309) for providing access to said image quality score.

14. The storage device of claim 13 wherein said features are selected from the group consisting of natural image statistics, texture features, direct noise blur and noise measure.

15. The storage device of claim 13 wherein said features are cross scale joint distribution features selected from the group consisting of negative log histogram of phase and negative log histogram of magnitude.

16. The storage device of claim 13 wherein said assessing is performed independent of a reference image and knowledge of a cause of degradation.

17. The storage device of claim 13 wherein said assessing is performed to sort and annotate a collection of photos according to image quality.

* * * * *